E. MILHOLLAND & E. F. SWEITZER.
LID AND COVER FOR COOKING UTENSILS.
APPLICATION FILED APR. 12, 1909.
950,552.
Patented Mar. 1, 1910.
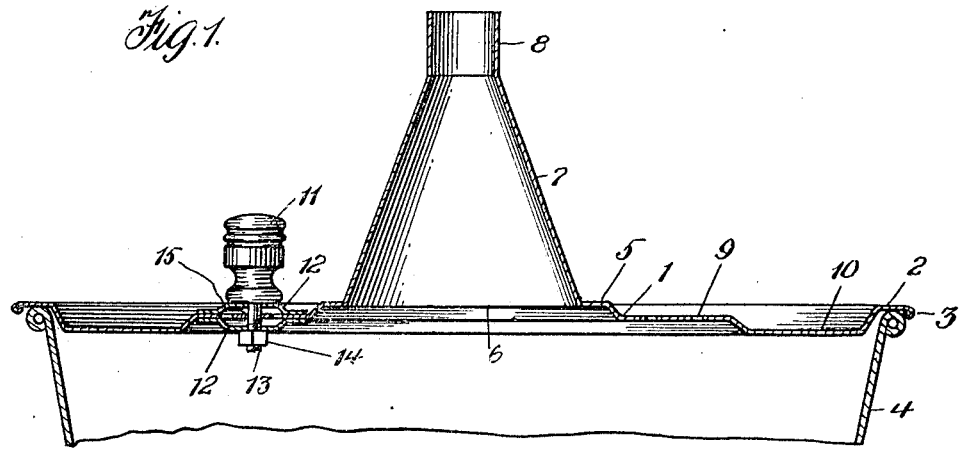
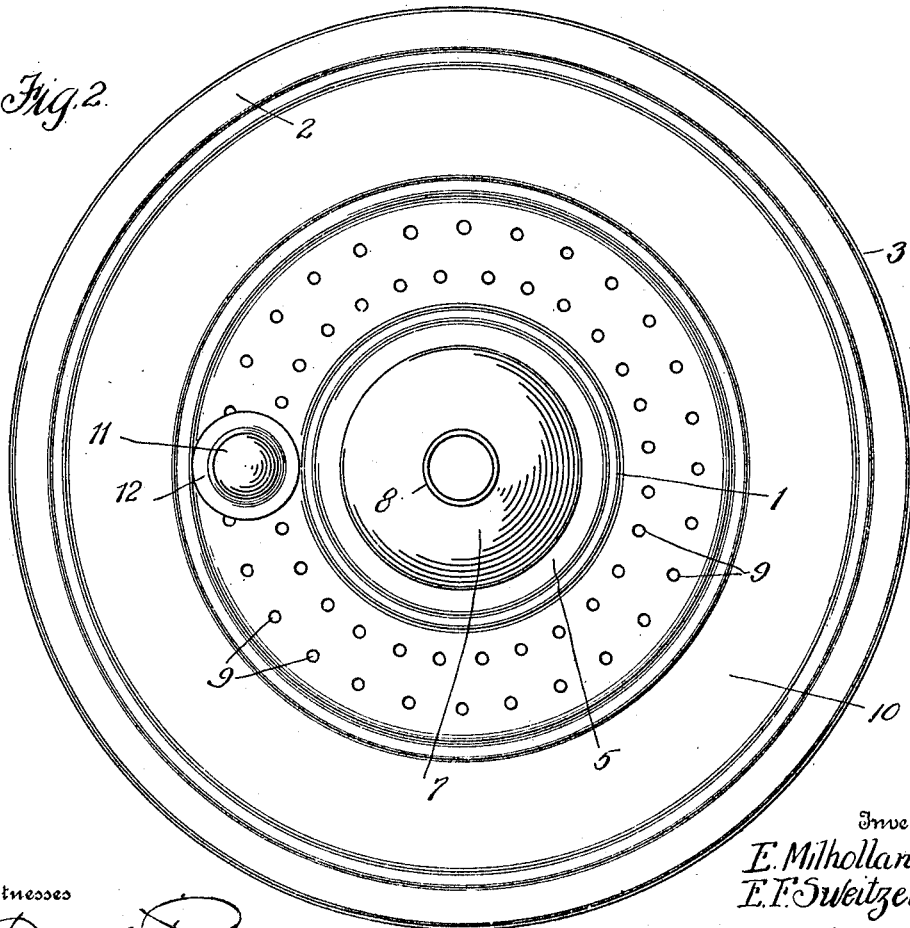
Witnesses
Inventors
E. Milholland.
E. F. Sweitzer.
By
Attorney

UNITED STATES PATENT OFFICE.

EMMA MILHOLLAND AND ELIZABETH F. SWEITZER, OF PITTSBURG, PENNSYLVANIA.

LID AND COVER FOR COOKING UTENSILS.

950,552.  Specification of Letters Patent.  Patented Mar. 1, 1910.

Application filed April 12, 1909. Serial No. 489,520.

*To all whom it may concern:*

Be it known that we, EMMA MILHOLLAND and ELIZABETH F. SWEITZER, citizens of the United States of America, residing at Pittsburg, in the county of Allegheny and State of Pennsylvania, have invented certain new and useful Improvements in Lids and Covers for Cooking Utensils, of which the following is a specification, reference being had therein to the accompanying drawing.

This invention relates to certain new and useful improvements in lids and covers for cooking utensils, and the primary object of our invention is to provide a simple and durable lid with an exhaust opening, to allow steam, fumes and gaseous matter to escape from a receptacle covered by our lid.

Another object of this invention is to provide a sanitary lid that can be easily handled and maintained in a clean condition.

A further object of this invention is to provide a utensil lid with a collecting gutter or receptacle for condensates or other matter escaping from a utensil.

A still further object of this invention is the provision of simple and effective means in connection with a utensil lid for preventing the overflowing or splashing of water from a utensil, thereby preventing a range or adjacent cooking vessels from being splashed and rendered uncleanly by grease and foreign matter.

A still further object of the invention is to provide a lid or cover that can be economically used to an advantage on pans, and similar vessels used for frying purposes, the lid or cover preventing meats etc. from drawing water.

We attain the above objects by an inexpensive lid or cover that can be used in connection with skillets, pots, kettles or any vessel, irrespective of what they contain.

The lid is designed whereby it can be inverted and used as a funnel or filling device for bottles, jugs or narrow neck receptacles.

The invention will be hereinafter considered in detail and then specifically claimed, and reference will now be had to the drawing forming a part of this application, wherein there is illustrated a preferred embodiment of our invention, but we would have it understood that the structural elements thereof can be varied or changed as to the shape and size without departing from the spirit of the invention.

In the drawings:—Figure 1 is a cross sectional view of the lid or cover as applied to a pan, and Fig. 2 is a plan of the same.

To put our invention into practice, we construct our lid or cover of strong and durable metal and stamp or press portions of the same, particularly the body, from sheet metal, while other portions are made separate and joined to the body.

The lid or cover comprises a circular body 1 having a peripheral flange 2 provided with a reamed or wire edge 3. The flange 2 is adapted to rest upon the upper edges of a receptacle 4, while the wire edge 3 protects the lid or cover from being bent or cracked.

Centrally of the body 1 is a circular raised portion 5 having a central circular opening 6 communicating with an inverted funnel or cone-shaped structure 7, said funnel having a neck 8. The body 1 surrounding the raised portion 5 is provided with a plurality of circumferential openings or perforations 9 for the exhaust of steam and gases from the receptacle 4.

Surrounding the perforated body 1 is an annular gutter or basis 10 adapted to catch drippings, condensate or matter ejected from the receptacle 4 through the openings 9.

In order that the lid or cover can be lifted from a hot receptacle, without burning the hand, the body 1 is provided with a knob or handle 11, secured to the body by washers 12, a bolt 13 and a nut 14, said bolt extending through an opening 15 provided therefor in the body 1.

It is apparent that the funnel 7 provides a sufficient exhaust opening for the outlet of steam, consequently steam will not escape from under the edges of the lid or cover and cause drippings upon the outer sides of the receptacle 4, or upon vessels in proximity to said receptacle. It will also be observed that the lid or cover can be inverted and used as a filling device for bottles, by inserting the neck 8 of the funnel in a bottle. The body 1 serves as a support for the funnel 7 when a small bottle is to be filled and is placed in a receptacle, upon the upper edges of which the body can rest.

The knob or handle 11 is preferably made of wood or a non-conductor of heat, while the remainder of the lid or cover is made of a non-corrosive metal or a metal treated or coated to prevent corrosion.

Having now described our invention what we claim as new, is:—

A lid or cover for cooking utensils, comprising a circular body having a peripheral edge adapted to rest upon the receptacle, said body having a central raised portion provided with a central opening, an inverted funnel carried by said body and having the upper end thereof provided with a neck communicating with said opening through the medium of said inverted funnel, said body having a plurality of circumferential openings formed therein surrounding said raised portion, said body having an annular basin formed therein between the peripheral edges of said lid and the circumferentially arranged openings, said basin being formed by countersinking an annular portion of said body to a plane below the central raised portion and the peripheral edges of said body and adapted to collect condensate ejected through the openings of said lid or cover, and a handle secured to said lid or cover adjacent to said raised portion and intermediate some of the openings of said lid or cover, substantially as described.

In testimony whereof we affix our signatures in the presence of two witnesses.

EMMA MILHOLLAND.
ELIZABETH F. SWEITZER.

Witnesses:
G. A. MILHOLLAND,
MAX H. SROLOVITZ.